United States Patent
Qiao (10) Patent No.: US 10,783,702 B2
(45) Date of Patent: Sep. 22, 2020

(54) IMAGING PROCESSING METHODS AND SYSTEMS USING A TARGET 3D MODEL BY PERFORMING 3D RECONSTRUCTION ON A TARGET IMAGE

(71) Applicant: BEIJING KUANGSHI TECHNOLOGY CO., LTD., Beijing (CN)

(72) Inventor: Liang Qiao, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/147,060

(22) Filed: Sep. 28, 2018

(65) Prior Publication Data

US 2019/0371050 A1 Dec. 5, 2019

(30) Foreign Application Priority Data

Jun. 4, 2018 (CN) .......................... 2018 1 0566077

(51) Int. Cl.
| | |
|---|---|
| G06T 17/00 | (2006.01) |
| G06T 5/00 | (2006.01) |
| G06T 5/50 | (2006.01) |
| G06T 15/00 | (2011.01) |
| G06T 15/50 | (2011.01) |
| G06T 15/60 | (2006.01) |

(52) U.S. Cl.
CPC .............. *G06T 17/00* (2013.01); *G06T 5/001* (2013.01); *G06T 5/50* (2013.01); *G06T 15/005* (2013.01); *G06T 15/506* (2013.01); *G06T 15/60* (2013.01); *G06T 2207/20221* (2013.01); *G06T 2207/30201* (2013.01); *G06T 2210/16* (2013.01)

(58) Field of Classification Search
CPC ........... G06T 17/00; G06T 5/001; G06T 5/50; G06T 15/005; G06T 15/506; G06T 15/60; G06T 2207/20221; G06T 2207/30201; G06T 2210/16
USPC ......................................................... 345/419
See application file for complete search history.

(56) References Cited

U.S. PATENT DOCUMENTS

| | | | | |
|---|---|---|---|---|
| 2010/0265365 | A1* | 10/2010 | Oshita | H04N 5/23219 348/241 |
| 2016/0217609 | A1* | 7/2016 | Kornilov | G06T 15/60 |
| 2018/0349008 | A1* | 12/2018 | Manzari | H04N 5/23222 |
| 2019/0116322 | A1* | 4/2019 | Holzer | G06T 7/11 |

* cited by examiner

Primary Examiner — King Y Poon
Assistant Examiner — Vincent Peren
(74) Attorney, Agent, or Firm — Hamre, Schumann, Mueller & Larson, P.C.

(57) ABSTRACT

The present disclosure relates to an image processing method and apparatus, an electronic device and a computer readable medium. The image processing method includes: acquiring an image to be processed, the image to be processed including a target portrait; obtaining a target three-dimensional (3D) model by performing a 3D reconstruction operation on the target portrait in the image to be processed; obtaining a portrait lighting image by performing portrait lighting processing on the target 3D model, and extracting a first image including the target portrait from the portrait lighting image; and merging a second image including a photographic background cloth and the first image into a target image, the second image being used as a background image of the first image.

13 Claims, 7 Drawing Sheets

IMAGING PROCESSING METHODS AND SYSTEMS USING A TARGET 3D MODEL BY PERFORMING 3D RECONSTRUCTION ON A TARGET IMAGE

CROSS-REFERENCE TO RELATED APPLICATION

The application claims priority to Chinese patent application No. 201810566077.3, filed Jun. 4, 2018, titled "Image Processing Method and Device, Electronic Device and Computer Readable Medium", the disclosure of which is incorporated herein by reference in its entirety as part of the application.

TECHNICAL FIELD

The present disclosure relates to the technical field of image processing, in particular to an image processing method and apparatus, an electronic device and a computer readable medium.

BACKGROUND

With the rapid development of smart terminal technology, smart terminal devices, especially smart mobile phones, have entered thousands of households. Existing smart mobile phones integrate a variety of features, e.g., high-definition photographing function. The portrait photographing applications of the existing smart mobile phones can usually beautify images taken by the cameras of the smart mobile phones.

However, when users wish to take a formal photo (e.g., a registration photo), they still need to go to a professional studio. Due to the physical limitations of portrait photography of smart mobile phones in facial distortion, scenery, lighting and definition, smart mobile phones can merely be used for entertainment and are unable to take professional portrait photos, for example, formal photos taken by professional studios.

SUMMARY

At least one embodiment of the present disclosure provides an image processing method, which includes: acquiring an image to be processed, the image to be processed comprising a target portrait; obtaining a target three-dimensional (3D) model by performing a 3D reconstruction operation on the target portrait in the image to be processed; obtaining a portrait lighting image by performing portrait lighting processing on the target 3D model, and extracting a first image comprising the target portrait from the portrait lighting image; and merging a second image comprising a photographic background cloth and the first image into a target image, the second image being used as a background image of the first image.

In the method according to some embodiments of the present disclosure, merging the second image comprising the photographic background cloth and the first image into the target image includes: taking the second image as an image of a background layer, and taking the first image as an image of a foreground layer; determining in the image of the background layer a pixel corresponding to a pixel of the image of the foreground layer, based on position information on the first image in the image to be processed; and replacing the pixel of the image of the background layer with the corresponding pixel of the image of the foreground layer to obtain the target image.

In the method according to some embodiments of the present disclosure, obtaining the portrait lighting image by performing the portrait lighting processing on the target 3D model includes: acquiring simulation lighting parameters, the simulation lighting parameter comprising at least one of the following: an illumination angle of a simulation light source, a distance between the simulation light source and the target 3D model, an amount of the simulation light source, a color temperature of the simulation light source, or a light intensity of the simulation light source; and obtaining the portrait lighting image by performing simulation lighting processing on the target 3D model based on the simulation lighting parameters.

In the method according to some embodiments of the present disclosure, obtaining the portrait lighting image by performing the portrait lighting processing on the target 3D model includes: obtaining a light-and-shadow image of the portrait by performing the portrait lighting processing on the target 3D model; and obtaining the portrait lighting image by rendering the image to be processed by using the light-and-shadow image of the portrait.

In the method according to some embodiments of the present disclosure, obtaining the portrait lighting image by rendering the image to be processed using the light-and-shadow image of the portrait includes: obtaining the portrait lighting image by multiplying a color value of a pixel in the image to be processed by a color value of a pixel in the light-and-shadow image of the portrait.

In the method according to some embodiments of the present disclosure, obtaining the light-and-shadow image of the portrait by performing the portrait lighting processing on the target 3D model includes: determining an illumination range of the simulation light source in the target 3D model based on a simulation lighting parameter, and determining an illumination value of a pixel within the illumination range in the target 3D model based on the simulation lighting parameter; and obtaining the light-and-shadow image of the portrait by summing the illumination value and a pixel value corresponding to the illumination value in the target 3D model.

The method according to some embodiments of the present disclosure further includes, subsequent to acquiring the simulation lighting parameters: obtaining a detection result by detecting an light intensity of the target portrait in the image to be processed; reducing the light intensity of the simulation light source in the simulation lighting parameter in the event that the detection result is that the light intensity is above a first set threshold; and increasing the light intensity of the simulation light source in the simulation lighting parameter in the event that the detection result is that the light intensity is below a second set threshold.

In the method according to some embodiments of the present disclosure, obtaining the target 3D model by performing the 3D reconstruction operation on the target portrait in the image to be processed includes: extracting a key point of the target portrait from the image to be processed; and inputting the key point of the target portrait into an artificial neural network to obtain the target 3D model of the target portrait.

In the method according to some embodiments of the present disclosure, extracting the first image comprising the target portrait from the portrait lighting image includes: separating the target portrait from a background image in the portrait lighting image by body segmentation to obtain the first image comprising the target portrait from the portrait lighting image.

The method according to some embodiments of the present disclosure further includes: acquiring an original image of the image to be processed; and acquiring a distortion factor of a photographing device, performing distortion correction on the target portrait in the original image by using the distortion factor to obtain the image to be processed.

The method according to some embodiments of the present disclosure further includes: beautifying the target portrait in the original image of the image to be processed to obtain the image to be processed.

The method according to some embodiments of the present disclosure further includes, subsequent to merging the second image comprising the photographic background cloth and the first image into the target image: acquiring a material image to be added; and adding the material image into the target image, so that an image layer where the material image is located is above an image layer where the target portrait in the target image is located.

At least one embodiment of the present disclosure provides an image processing apparatus includes: an acquisition unit configured to acquire an image to be processed, the image to be processed comprising a target portrait; a 3D reconstruction unit configured to obtain a target 3D model by performing a 3D reconstruction operation on the target portrait in the image to be processed; a lighting processing unit configured to obtain a portrait lighting image by performing portrait lighting processing on the target 3D model, and extract a first image comprising the target portrait from the portrait lighting image; and an image merging unit configured to merge a second image comprising a photographic background cloth and the first image into a target image, the second image being used as a background image of the first image.

At least one embodiment of the present disclosure provides an electronic device, which includes a processor, a memory storing a computer program being capable of being executed by the processor, the computer program when executed by the processor, causing the processor to perform the method according to at least one embodiment of the present disclosure.

At least one embodiment of the present disclosure provides a computer storage medium, storing a computer program, the computer program when executed by a computer, causing the computer to perform the method according to at least one embodiment of the present disclosure.

Other characteristics and advantages of the present disclosure will be set forth in the following description, partially apparent from the description or understood by the implementation of the present disclosure. The objectives and other advantages of the present disclosure are implemented and achieved in the structures particularly pointed out in the description, the claims and the drawings.

Detailed description will be given below to the exemplary embodiments with reference to the accompanying drawings to provide a more clear understanding of the objectives, the characteristics and the advantages of the present disclosure.

BRIEF DESCRIPTION OF THE DRAWINGS

In order to more clearly illustrate the technical solutions of the embodiments of the present disclosure, brief description will be given below to the accompanying drawings required to be used in the description of the embodiments. Apparently, the drawings described below only involve some embodiments of the present disclosure. Other drawings may also be obtained by those skilled in the art without creative efforts on the basis of these drawings.

DETAILED DESCRIPTION

In order to make objects, technical solutions and advantages of the embodiments of the disclosure apparent, the technical solutions of the embodiments will be described clearly and completely in conjunction with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Firstly, an electronic device 100 provided by some embodiments of the present disclosure is described with reference to FIG. 1. The electronic device may be used for executing an image processing method provided by various embodiments of the present disclosure.

Figure 1:
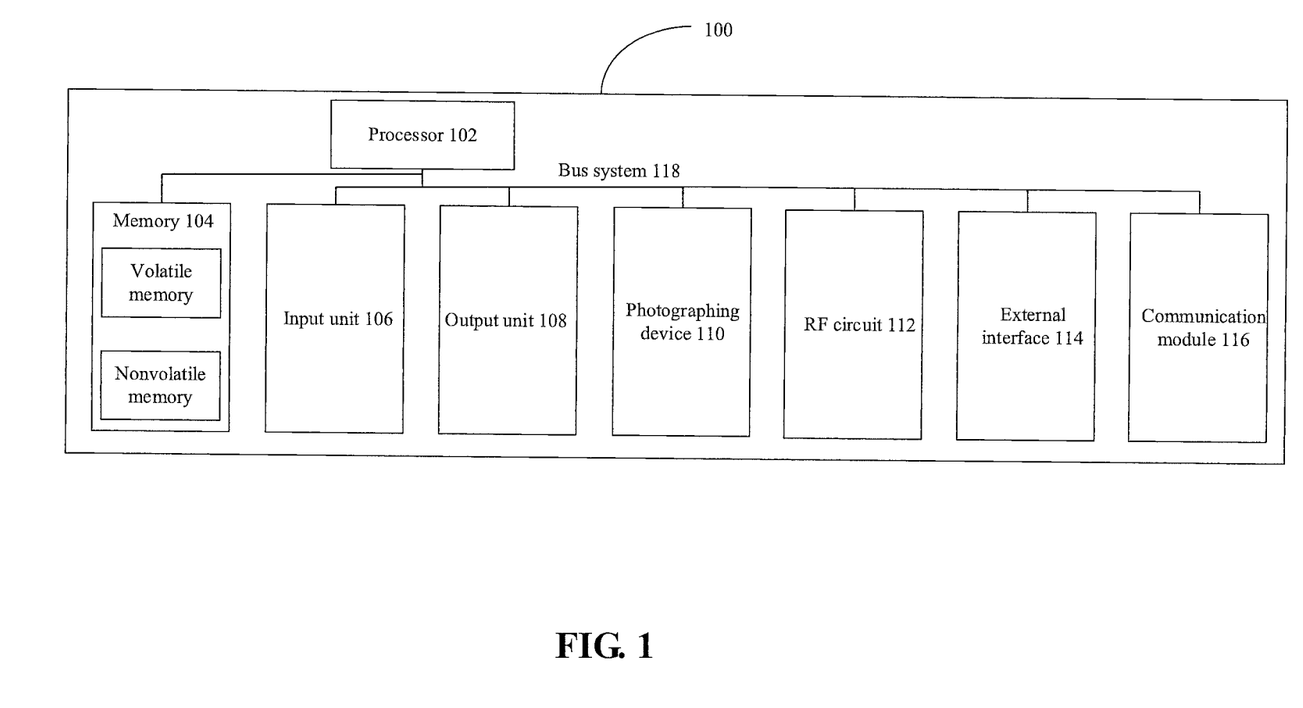
FIG. 1 is a schematic diagram of an electronic device provided by some embodiments of the present disclosure.

As shown in FIG. 1, the electronic device 100 comprises one or more processors 102, one or more memories 104, an input unit 106, an output unit 108, a photographing device 110, a radio-frequency (RF) circuit 112, an external interface 114 and a communication module 116. These components are connected with each other through a bus system 118 and/or connecting mechanisms in other forms (not shown). It could be understood that the components and the structures of the electronic device 100 as shown in FIG. 1 are only illustrative and not limiting. The electronic device may also include other components and structures as required.

The processor 102 may be implemented by at least one of the following hardware: a digital signal processor (DSP), a field programmable gate array (FPGA), a programmable logic array (PLA) or an application-specific integrated circuit (ASIC). The processor 102 may be a central processing unit (CPU) or a processing unit of other forms having data processing capabilities and/or instruction execution capabilities, and the processor 102 may control other components in the electronic device 100 to execute required functions.

The memory 104 may include one or more computer program products. The computer program products may include various forms of computer readable storage media, e.g., volatile memories and/or nonvolatile memories. The volatile memory, for instance, may include a random access memory (RAM) and/or a cache. The nonvolatile memory, for instance, may include a read-only memory (ROM), a hard disk, a flash memory, etc. One or more computer program instructions may be stored on the computer readable storage medium. The processor 102 may execute the program instructions, so as to realize the client function as described below in the embodiment of the present disclosure (implemented by the processor) and/or other required functions. Various applications and various data, e.g., data used and/or produced by the applications, may also be stored in the computer readable storage medium.

The input unit 106 may be a device that is used by a user to input instructions, and may include one or more selected from a keyboard, a mouse, a microphone and a touch panel.

The output unit 108 may output various information (e.g., image or sound) to the outside (for instance, the user), and may include one or more of a display, a loudspeaker, etc.

The photographing device 110 is used for image acquisition. A target image is obtained by processing data acquired by the photographing device by an image processing method. For instance, the photographing device may capture images desired by the user (e.g., photos and videos), and the image is processed by the image processing method to obtain a target image. The photographing device may also store the captured images in the memory 104 for the use of other components.

The RF circuit 112 receives and sends electromagnetic waves. The RF circuit 12 converts electrical signals into electromagnetic waves, or converts electromagnetic waves into electrical signals, and communicates with a communication network and other communication equipment through the electromagnetic waves. The RF circuit 112 may include known circuits for executing the functions, including but not limited to an antenna system, an RF transceiver, one or more amplifiers, a tuner, one or more oscillators, a DSP, a CODEC chip set, a subscriber identity module (SIM) card and a memory. The RF circuit 112 may communicate with the network and other devices through wireless communication. The network includes, for instance, the Internet, also referred to as the World Wide Web (WWW), an intranet and/or a wireless network such as a cellular telephone network, a wireless local area network (WLAN) and/or a metropolitan area network (MAN). The wireless communication may adopt any of a variety of communication standards, protocols and technologies, including but not limited to Global System for Mobile communications (GSM), Enhanced Data GSM Environment (EDGE), wideband code division multiple access (W-CDMA), code division multiple access (CDMA), time-division multiple address (TDMA), Bluetooth, Wireless Fidelity (Wi-Fi) (e.g., IEEE 802.11a, IEEE 802.11b, IEEE 802.11g and/or IEEE 802.11n), Voice over IP (VoIP), Wi-MAX, a protocol for email, instant messaging and/or Short Message Service (SMS), or any other suitable communication protocol, including communication protocols that have not been developed as of the filing date of this document.

The communication module 116 may communicate with other devices through one or more external ports 114, and may include a variety of software components for processing data received by the RF circuit 112 and/or the external port 114. The external port 114 (e.g., universal serial bus (USB) or FIREWIRE) is applicable to be directly or indirectly coupled to other devices via a network (such as the Internet or WLAN).

Illustratively, the electronic device for implementing the image processing method provided by the embodiments of the present disclosure may be implemented as a smart mobile terminal such as a smart mobile phone or a tablet PC.

Some embodiments of the present disclosure provides an image processing method. It should be noted that the steps shown in the flowchart of the accompanying drawings may be executed in a computer system, such as a set of computer-executable instructions. Moreover, although a logical order is shown in the flowchart, in some cases, the steps shown or described may be executed in an order different from the one described herein.

Figure 2:
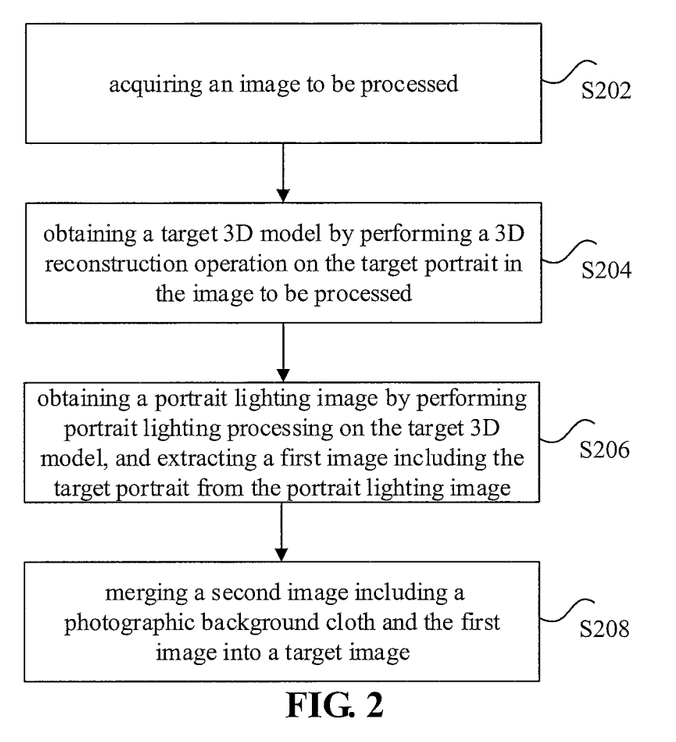
FIG. 2 is a flowchart of an image processing method provided by some embodiments of the present disclosure.

FIG. 2 is a flowchart of an image processing method provided by some embodiments of the present disclosure. As shown in FIG. 2, the method comprises the following steps.

S202: acquiring an image to be processed, the image to be processed including a target portrait. The target portrait may be a full or partial facial image, may be a full-body image of a person, and may also be a half-length image of a person, which is not specifically limited in the embodiment.

S204: obtaining a target 3D model by performing a 3D reconstruction operation on the target portrait in the image to be processed.

S206: obtaining a portrait lighting image by performing portrait lighting processing on the target 3D model, and extracting a first image including the target portrait from the portrait lighting image. The portrait lighting processing in the embodiment is to process the target 3D model by simulating the lighting manner of professional studios, so that the image to be processed after processing can restore the studio lighting method in the physical world as much as possible.

S208: merging a second image including a photographic background cloth and the first image into a target image, the second image being used as a background image of the first image.

It should be noted that in the embodiment, the steps S202 to S208 may be applied on smart mobile terminals such as smart mobile phones and tablet PCs.

When the method is applied on the smart mobile terminal, a virtual studio-like portrait effect can be produced by photographs taken by the portrait photographing function of the smart mobile terminal. When the user wishes to take a formal photo, the user does not need to find a professional studio. Particularly when the user urgently needs a formal photo, it can be realized easily and quickly by the smart mobile terminal.

In the embodiments of the present disclosure, the target 3D model is obtained by performing the 3D reconstruction operation on the target portrait in the image to be processed; the portrait lighting image is obtained by performing the portrait lighting processing on the target 3D model, and the first image including the target portrait is extracted from the portrait lighting image, and after the image to be processed is processed by the above processes, the studio lighting manner in the physical world can be restored as much as possible; and the target image is obtained by merging the second image including the photographic background cloth and the first image. In the embodiments of the present disclosure, the above-mentioned processing method may be adopted to solve the technical problem that the virtual studio-like portrait effect cannot be produced by the photographs taken by the portrait photographing function of the conventional smart mobile terminal, so that the photographs taken by the portrait photographing function of the smart mobile terminal may produce the virtual studio-like portrait effect.

In the embodiments of the present disclosure, the steps S202 to S208 may be performed on a large number of images; or the steps S202 to S208 may also be executed after one image is acquired each time. No specific limitation will be given in the embodiment. The image processing method will be described below with reference to the specific embodiments.

As known from the above description, in the embodiments, an image to be processed which include a target portrait is acquired at first. The image to be processed may be an original image that is captured by the photographing device of the smart mobile terminal and is not processed. The image to be processed may also be an image that is captured by the photographing device of the smart mobile terminal and is processed. More specifically, the processing may be distortion correction and/or beautifying.

In an optional embodiment, an original image of the image to be processed, captured by the photographing device of the smart mobile terminal, is acquired; and then, the image to be processed is obtained by acquiring a distortion factor of the photographing device and utilizing the distortion factor to perform distortion correction on the target portrait in the original image.

More specifically, as the photographing device on the smart mobile terminal is usually a wide-angle lens, the smart mobile terminal will produce image distortion when taking self-portraits. Distortion belongs to the geometric distortion of images, and is a picture distortion phenomenon caused by different magnifications in different regions on the focal plane. However, studios in the physical world use a portrait lens having a focal length of 55 mm or more, which does not cause image distortion. In most cases, these distortions need to be corrected to the extent that normal human eyes do not see any distortion. Therefore, a distortion correction algorithm is required to solve this problem.

In the embodiments, the image to be processed is obtained by adoption of distortion correction algorithm to perform distortion correction on the target portrait in the image to be processed.

Specifically, parameter calibration may be performed in advance to the photographing device of the smart mobile terminal to determine the distortion factor of the photographing device; and after the distortion factor of the photographing device is determined, when taking a photo, the photographing device can perform distortion correction on the photo by the distortion correction algorithm and then output the photo.

It should be noted that in the embodiment, in the process of performing distortion correction on the original image, distortion correction may be only performed on the target portrait in the original image. Specifically, key points of the target portrait may be detected in the original image; after the key points are obtained, an area where the portrait is located is determined based on the key points; and subsequently, the target portrait is subjected to distortion correction. More specifically, pixels of the target portrait may be subjected to distortion correction by utilization of the distortion factor, and the image to be processed is obtained after the distortion correction.

In another optional embodiment, an original image (the original image of the image to be processed) captured by the photographing device of the smart mobile terminal is acquired; and then, the image to be processed is obtained by beautifying the target portrait in the original image of the image to be processed.

In the embodiment, a beautifying algorithm is utilized to solve the problem of facial makeup of the target portrait and prepare for studio-portrait photography.

Optionally, the steps of implementing the beautifying algorithm include: 1. blurring the image by a filtering algorithm with an edge-preserving effect; 2. adopting a skin color detection algorithm to protect non-skin areas; 3. merging the blurred image and the original image; and 4. sharpening the merged image.

It should be noted that apart from the above-mentioned beautifying functions, other beautifying functions may also be set, e.g., whitening, definition and screenshot. No specific limitation is given in the embodiments.

Moreover, it should be noted that in the embodiment, before taking a photo by the smart mobile terminal according to the steps as described above, beautifying parameters such as whiteness, definition, and skin-smoothing degree may be manually set in advance. After the settings are completed, in the process of beautifying the original image, the original image may be beautified according to the set beautifying parameters.

In another optional embodiment, after acquiring the original image (the original image of the image to be processed) captured by the photographing device of the smart mobile terminal, the original image may be sequentially processed in combination with the above-mentioned distortion correction algorithm and the beautifying algorithm. The specific processing sequence is not specifically limited in the embodiment.

In the embodiment, after the image to be processed is obtained by the above-mentioned processing method, the target 3D model may be obtained by performing a 3D reconstruction operation on the target portrait in the image to be processed. After the target 3D model is obtained, the portrait lighting image is obtained by performing portrait lighting processing on the target 3D model.

As the professional studios use different lighting methods to brighten the face and the body, but the hardware of the mobile phones does not have the above lighting abilities, in the embodiment, the portrait lighting method is adopted to process the target portrait, so as to simulate the lighting manner of the professional studio, and then the obtained portrait lighting image can restore the studio lighting effect in the physical world as much as possible.

In the embodiment, the objective is to simulate and restore the lighting effect of professional studios in the physical world as much as possible, so that it looks like a professional lighter is lighting when consumers take pictures. Specifically, the above objective may be achieved by the following method: generating 3D information on the target portrait to obtain a 3D model (namely the above target 3D model) of the target portrait; and freely controlling simulation lighting parameters in a render layer, and performing simulation lighting processing on the 3D model of the target portrait based on the simulation lighting parameters. The process will be described below in detail.

In an optional embodiment, the step S204 of obtaining the target 3D model by performing the 3D reconstruction operation on the target portrait in the image to be processed includes: extracting key points of the target portrait from the image to be processed; and inputting the key points of the target portrait into an artificial neural network for processing to obtain the target 3D model of the target portrait.

Figure 3:
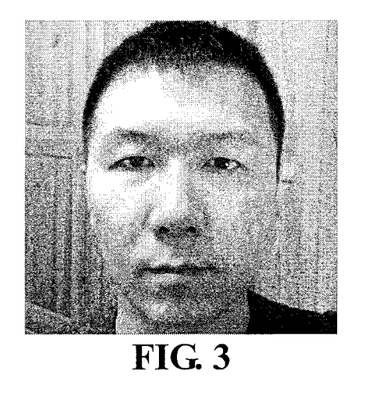
FIG. 3 is a schematic diagram of an optional image to be processed according to some embodiments of the present disclosure.
Figure 4:
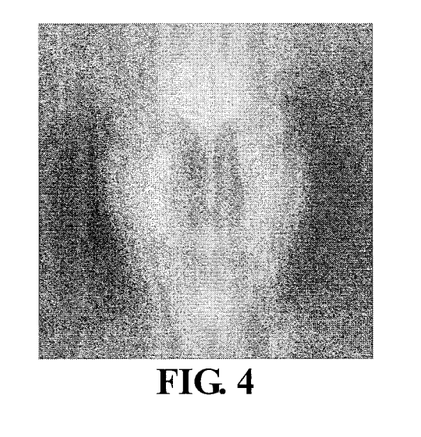
FIG. 4 is a schematic diagram of an optional target 3D model according to some embodiments of the present disclosure.

In the embodiment, the key points (for instance, key points of the human face) of the target portrait in the image to be processed are extracted; and after the key points of the target portrait are extracted, the key points of the target portrait may be processed via the artificial neural network, so as to obtain the target 3D model of the target portrait. FIG. 3 shows the image to be processed, and FIG. 4 shows the target 3D model of the human face in the image to be processed.

It should be noted that in the embodiment, the artificial neural network is a neural network that has been trained beforehand. In the process of training the artificial neural network, the inputs are key points of a portrait in a training sample, and the outputs is a 3D model of the training sample.

After the target 3D model is obtained, the portrait lighting image may be obtained by performing the portrait lighting processing on the target 3D model.

In an optional embodiment, the step S206 of obtaining the portrait lighting image by performing the portrait lighting processing on the target 3D model includes the following steps.

S11: obtaining a light-and-shadow image of the portrait by performing the portrait lighting processing on the target 3D model.

S12: obtaining the portrait lighting image by rendering the image to be processed by using the light-and-shadow image of the portrait.

Optionally, the step S12 of obtaining the portrait lighting image by rendering the image to be processed by using the light-and-shadow image of the portrait includes: obtaining the portrait lighting image by multiplying the color value of a pixel in the image to be processed by the color value of a pixel in the light-and-shadow image of the portrait.

In the embodiment, during performing the portrait lighting processing on the target 3D model, the target 3D model may be subjected to the portrait lighting processing based on simulation lighting parameters. It is well known that in the process of shooting in a professional studio, the photographer will place one or more photographic lamps around a subject to be photographed. In the embodiment, in order to restore the lighting manner of the professional studio in the physical world as much as possible, the target 3D model is subjected to the simulation lighting processing by setting the simulation lighting parameters, and the lighting effect in the processed image may simulate the lighting effect of the professional studio in the physical world.

Figure 5:
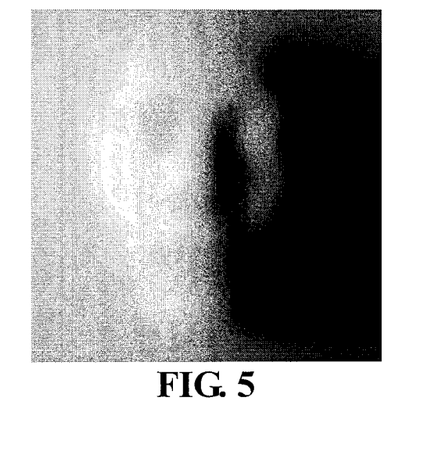
FIG. 5 is a schematic diagram of an optional light-and-shadow image of a portrait according to some embodiments of the present disclosure.

More specifically, in the embodiment, the simulation lighting parameters include at least one of the following: the illumination angle of a simulation light source, the distance between the simulation light source and the target 3D model, the amount of the simulation light source, the color temperature of the simulation light source, or the light intensity of the simulation light source. For instance, a white simulation point light source is set, and the light source is set to illuminate from the left side of the target portrait at 70 degrees. After the simulation lighting parameters are set, simulation lighting processing may be performed on the target 3D model based on the simulation lighting parameters, and for instance, a light-and-shadow image of the portrait as shown in FIG. 5 may be obtained.

Figure 6:
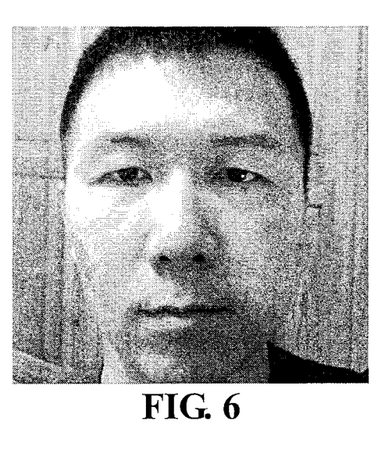
FIG. 6 is a schematic diagram of an optional image to be processed, obtained after being processed, according to some embodiments of the present disclosure.

After the light-and-shadow image of the portrait is obtained, the image to be processed may be rendered by using the light-and-shadow image of the portrait to obtain the portrait lighting image. Supposing the image to be processed is as shown in FIG. 3, after the image is processed by the above-mentioned method, the target 3D model as shown in FIG. 4 is obtained, and the light-and-shadow image of the portrait as shown in FIG. 5 is obtained. Subsequently, an image as shown in FIG. 6 (namely the portrait lighting image) may be obtained by rendering the image to be processed as shown in FIG. 3 by using the light-and-shadow image of the portrait as shown in FIG. 5.

In the embodiments, one implementation of rendering the image to be processed by using the light-and-shadow image of the portrait is to multiply the color values of pixels in the image to be processed by the color values of pixels in the light-and-shadow image of the portrait, so as to render the image to be processed by using the light-and-shadow image of the portrait.

In another optional embodiment, the step S206 of obtaining the portrait lighting image by performing the portrait lighting processing on the target 3D model includes the following steps.

S21: acquiring simulation lighting parameters, the simulation lighting parameter includes at least one of the following: the illumination angle of the simulation light source, the distance between the simulation light source and the target 3D model, the amount of the simulation light sources, the color temperature of the simulation light source, or the light intensity of the simulation light source.

S22: obtaining the portrait lighting image by performing simulation lighting processing on the target 3D model based on the simulation lighting parameters.

In the embodiments, the simulation lighting parameters are acquired, and then the portrait lighting image is obtained by performing the simulation lighting processing on the target 3D model based on the simulation lighting parameters. More specifically, the process includes: determining the illumination range of the simulation light source in the target 3D model based on the simulation lighting parameter, and determining the illumination value of pixels within the illumination range in the target 3D model based on the simulation lighting parameter; obtaining the light-and-shadow image of the portrait by summing the illumination value and a pixel value corresponding to the illumination value in the target 3D model; and obtaining the portrait lighting image by rendering the image to be processed by using the light-and-shadow image of the portrait.

In the embodiments, in order to restore the lighting manner of the professional studio in the physical world as much as possible, the target 3D model is subjected to the simulation lighting processing by setting the simulation lighting parameters, and the lighting effect in the processed image may simulate the lighting effect of the professional studio in the physical world.

In another optional embodiment, after the simulation lighting parameters are acquired, the method further comprises the following steps: obtaining a detection result by detecting the light intensity of the target portrait in the image to be processed; reducing the light intensity of the simulation light sources in the simulation lighting parameters in the event that the detection result is that the light intensity is above a first set threshold; and increasing the light intensity of the simulation light sources in the simulation lighting parameters in the event that the detection result is that the light intensity is below a second set threshold.

More specifically, in the embodiment, the simulation lighting parameters are set in advance, and the simulation lighting parameters include the following types of parameters: the illumination angle of the simulation light source, the distance between the simulation light source and the target 3D model, the amount of the simulation light source, the color temperature of the simulation light source, and the light intensity of the simulation light source. Before performing the portrait lighting processing on the target 3D model, the light intensity of the target portrait in the image to be processed may be detected to obtain the detection result.

In the event that it is determined that the light intensity of the target portrait in the image to be processed is above the first set threshold based on the detection result, the light intensity of the simulation light source in the simulation lighting parameters is reduced by, for instance, multiplying the light intensity of the simulation light source in the simulation lighting parameters by a percentage less than 1. In the event that it is determined that the light intensity of the target portrait in the image to be processed is below the second set threshold based on the detection result, the light intensity of the simulation light source in the simulation lighting parameters is increased by, for instance, multiplying the light intensity of the simulation light source in the simulation lighting parameters by a percentage greater than 1.

After the processes as described above, the acquired simulation lighting parameters may be adjusted based on the light intensity of the target portrait in the image to be processed. It should be noted that in the embodiment, one objective of processing by the above-mentioned method is to prevent the light intensity of the target portrait in the portrait lighting image from being too high, or prevent the light intensity of the target portrait in the portrait lighting image from being not high enough, as the light intensity which is too high or not high enough will affect the display effect of the portrait lighting image.

In another optional embodiment, the step of obtaining the light-and-shadow image of the portrait by the portrait lighting of the target 3D model includes the following steps: determining the illumination range of the simulation light source in the target 3D model based on the simulation lighting parameter, and determining the illumination value of pixels within the illumination range in the target 3D model based on the simulation lighting parameter; and obtaining the light-and-shadow image of the portrait by summing the illumination value and a pixel value corresponding to the illumination value in the target 3D model.

In the embodiments, the position coordinate of the simulation light source in the target 3D model may be determined based on the determined simulation lighting parameters. For instance, the determined position coordinate is (x, y). After the position coordinate is determined, the illumination range of the simulation light source may be determined based on the position coordinate. Subsequently, the illumination value of pixels within the illumination range may be determined. Based on the characteristics of the light source, the light near the light source is strong, and the light away from the light source is weak and shadows will be produced. Therefore, in the embodiments, the illumination value of the pixels within the illumination range may be determined based on the characteristics of the light source.

After the illumination value is obtained, the illumination value and the pixel value corresponding to the illumination value in the target 3D model are summed, and the light-and-shadow image of the portrait may be obtained after summing. Corresponding pixel values in the target 3D model refer to the pixel value of the pixel within the illumination range in the target 3D model.

In the embodiments, after the image to be processed is processed by the above-mentioned method, the first image including the target portrait may be extracted from the portrait lighting image.

In an optional embodiment, the step of extracting the first image including the target portrait from the portrait lighting image includes the following steps: separating the target portrait and a background image in the portrait lighting image by body segmentation, and obtaining the first image including the target portrait from the portrait lighting image. After the first image is obtained, a second image including a photographic background cloth and the first image may be merged into a target image.

Since the shooting scenarios of the smart mobile terminal are uncontrollable, the shooting background is often messy. The professional studio is in a closed space with artificial scenery, so the shooting background is often simple. Therefore, in the embodiments, the body of the portrait (the image to be processed after processing) should be separated from the background by body segmentation, and the studio background cloth is converted into an RGB image (namely the second image) which is bonded to a background layer of the first image, so as to realize the effect of virtual green screen/virtual background.

It should be noted that in the embodiments, the second image in the image library has multiple types, and before the image to be processed is processed by the above-mentioned method, the user may select one second image as a background image according to actual demands. If the user selects the background image in advance, the target image will be synthesized based on the default background image.

In another optional embodiment, the step S108 of merging the second image including the photographic background cloth and the first image into the target image includes the following steps.

S1081: taking the second image as an image of the background layer, and taking the first image as an image of a foreground layer.

S1082: determining pixels, corresponding to pixels of the image of the foreground layer, in the image of the background layer based on position information on the first image in the image to be processed.

S1083: replacing the pixels of the image of the background layer with the pixels of the image of the foreground layer corresponding to the pixels of the image of the background layer to obtain the target image.

In the embodiments, the second image including the photographic background cloth is taken as the image of the background layer, the first image is taken as the image of the foreground layer, and then the image of the background layer and the image of the foreground layer are merged.

In the process of merging the image of the background layer and the image of the foreground layer, as the size of the image of the background layer is the same with the size of the image to be processed, in the embodiments, the position information of the target portrait (the first image) in the image to be processed may be determined, and the position of the first image is determined in the image of the background layer based on the position information; then, pixels corresponding to the first image are determined at the position; and finally, the determined pixels are replaced with the pixels of the first image, so as to merge the image of the background layer and the image of the foreground layer.

In the embodiments, after the second image including the photographic background cloth and the first image are merged into the target image, an material image to be added may also be acquired; and the material image is added into the target image, so that an image layer where the material image is located is disposed above an image layer where the target portrait in the target image is located. The material images refer to materials in the form of image, and the material images show elements that may be used to form an image.

Specifically, in the embodiment, problems in retouching may be solved by utilization of material overlay and filters, making the scene of the portrait more enriched and more colorful.

It should be noted that the material image to be added may be a default material image and may also be a material image selected by the user in advance.

For instance, a material image library includes a variety of material images, and the user may select at least one material image in each kind of material images as the material image to be added.

As can be seen from the above description, in the embodiments of the present disclosure, the above-mentioned processing method can be adopted to solve the technical problem that the portrait photography using the existing smart terminal devices cannot produce a virtual studio-like portrait effect, so that the portrait photography using the smart terminal device can produce the virtual studio-like portrait effect.

Figure 7:
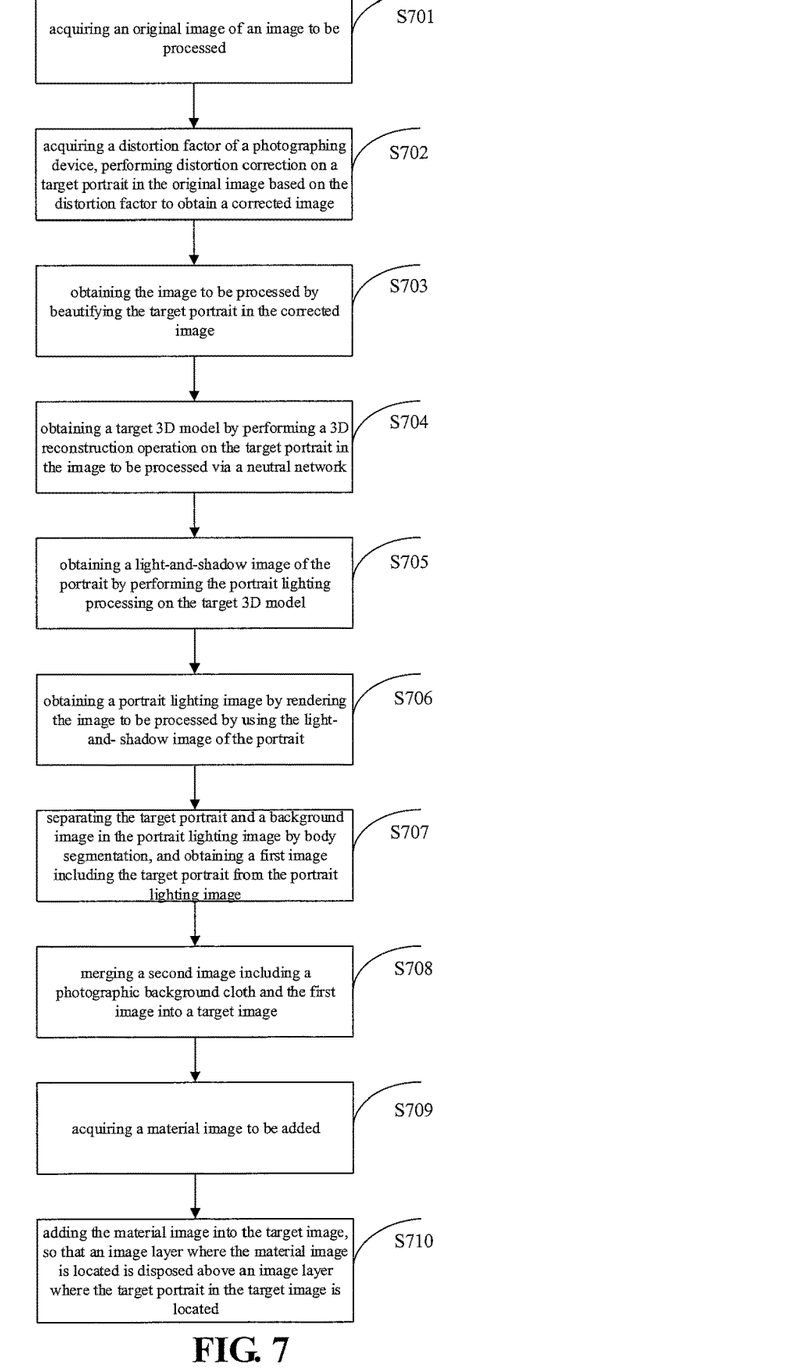
FIG. 7 is a flowchart of an optional image processing method provided by some embodiments of the present disclosure.

FIG. 7 is a flowchart of an optional image processing method provided by some embodiments of the present disclosure. As shown in FIG. 7, the method comprises the following steps.

S701: acquiring an original image of an image to be processed.

S702: acquiring a distortion factor of a photographing device, performing distortion correction on a target portrait in the original image based on the distortion factor to obtain a corrected image.

S703: obtaining the image to be processed by beautifying the target portrait in the corrected image. In the embodiments, a beautifying algorithm is utilized to solve the problem of facial makeup of the target portrait and prepare for studio portrait photography.

S704: obtaining a target 3D model by performing a 3D reconstruction operation on the target portrait in the image to be processed via a artificial neural network. More specifically, step S704 includes: extracting key points of the target portrait from the image to be processed; and inputting the key points of the target portrait into the artificial neural network to obtain the target 3D model of the target portrait.

S705: obtaining a light-and-shadow image of the portrait by performing the portrait lighting processing on the target 3D model.

S706: obtaining a portrait lighting image by rendering the image to be processed by using the light-and-shadow image of the portrait.

S707: separating the target portrait and a background image in the portrait lighting image by body segmentation, and obtaining a first image including the target portrait from the portrait lighting image.

S708: merging a second image including a photographic background cloth and the first image into a target image, the second image in the target image being a background image of the first image.

S709: acquiring a material image to be added.

S710: adding the material image into the target image, so that an image layer where the material image is located is disposed above an image layer where the target portrait in the target image is located.

The implementation of the steps S701 to S710 is as described above, and the detailed description of which will not be repeated herein.

Figure 8:
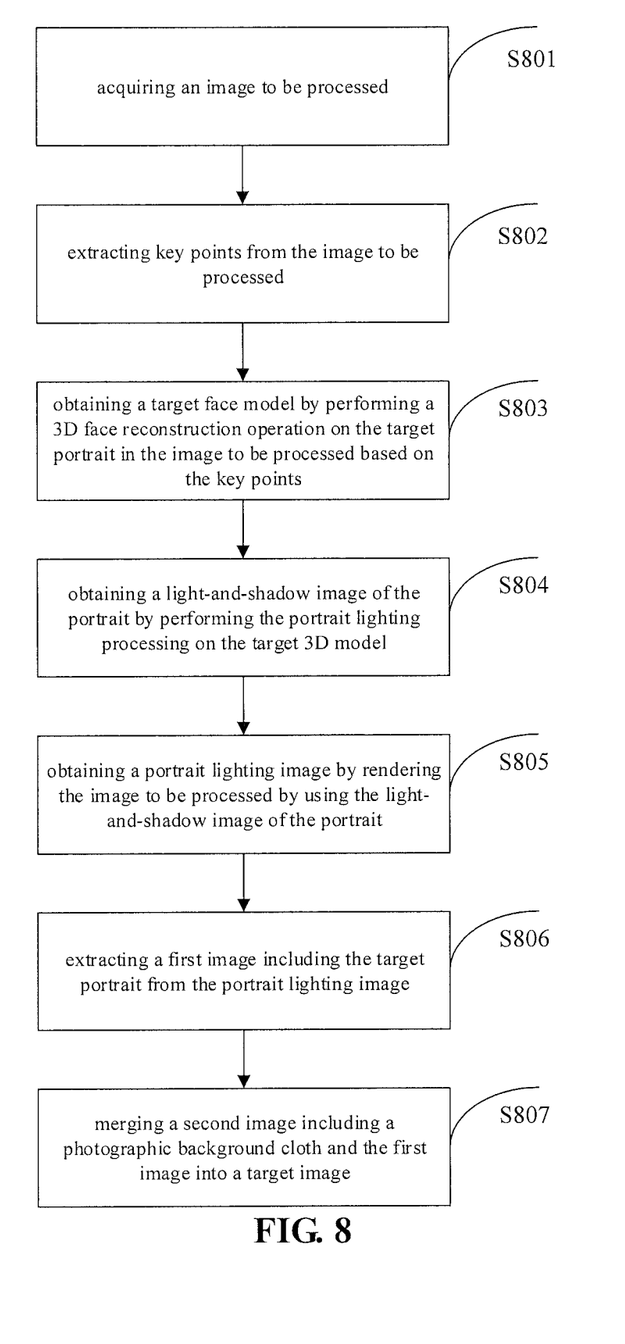
FIG. 8 is a flowchart of another optional image processing method provided by some embodiments of the present disclosure.

FIG. 8 is a flowchart of another optional image processing method provided by the embodiment of the present disclosure. As shown in FIG. 8, the method comprises the following steps.

S801: acquiring an image to be processed, which includes a target portrait.

S802: extracting key points from the image to be processed.

S803: obtaining a target face model by performing a 3D face reconstruction operation on the target portrait in the image to be processed based on the key points.

Optionally, the step of obtaining the target face model by performing the 3D face reconstruction operation on the target portrait in the image to be processed based on the key points includes: obtaining the target 3D model by performing the 3D reconstruction operation on the target portrait in the image to be processed via a artificial neural network.

S804: obtaining a light-and-shadow image of the portrait by performing the portrait lighting processing on the target 3D model.

S805: obtaining a portrait lighting image by rendering the image to be processed by using the light-and-shadow image of the portrait.

S806: extracting a first image including the target portrait from the portrait lighting image.

S807: merging a second image including a photographic background cloth and the first image into a target image. At step S807, the second image in the target image is a background image of the first image.

The implementation of the steps S801 to S807 is as described in the above embodiments, and detailed description of which will not be repeated.

Some embodiments of the present disclosure further provides an image processing apparatus. The image processing apparatus is mainly used for executing the foregoing image processing method provided by the embodiments of the present disclosure. Detailed description will be given below to the image processing method provided by the embodiment of the present disclosure.

Figure 9:
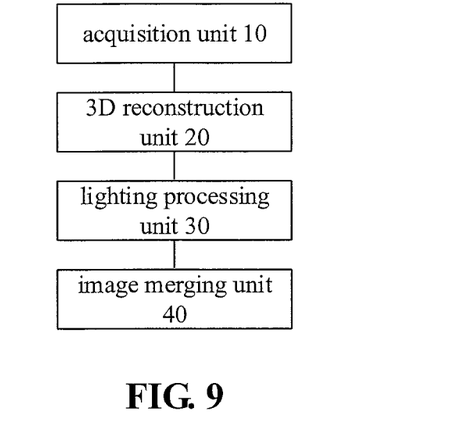
FIG. 9 is a schematic diagram of an image processing device provided by some embodiments of the present disclosure.

FIG. 9 is a schematic diagram of an image processing apparatus provided by the embodiment of the present disclosure. As shown in FIG. 9, the image processing apparatus mainly comprises an acquisition unit 10, a 3D reconstruction unit 20, a lighting processing unit 30 and an image merging unit 40.

The acquisition unit 10 is configured to acquire an image to be processed, which includes a target portrait.

The 3D reconstruction unit 20 is configured to obtain a target 3D model by performing a 3D reconstruction operation on the target portrait in the image to be processed.

The lighting processing unit 30 is configured to obtain a portrait lighting image by performing portrait lighting processing on the target 3D model, and extract a first image including the target portrait from the portrait lighting image.

The image merging unit 40 is configured to merge a second image including a photographic background cloth and the first image into a target image, and the second image is a background image of the first image.

In the embodiments of the present disclosure, the target 3D model is obtained by performing the 3D reconstruction operation on the target portrait in the image to be processed; the portrait lighting image is obtained by performing the portrait lighting processing on the target 3D model, and the first image including the target portrait is extracted from the portrait lighting image, and after the image to be processed is processed by the above processes, the studio lighting manner in the physical world can be restored as much as possible; and the second image including the photographic background cloth and the first image are merged into the target image. In the embodiments of the present disclosure, the above-mentioned processing method can be adopted to solve the technical problem that the virtual studio-like portrait effect cannot be produced by the photographs taken by the portrait photographing function of the conventional smart mobile terminal, so that the virtual studio-like portrait effect can be produced by the photographs taken by the portrait photographing function of the smart mobile terminal.

Optionally, the image merging unit is configured to: take the second image as an image of a background layer, and take the first image as an image of a foreground layer; determine pixels, corresponding to pixels of the image of the foreground layer, in the image of the background layer based on position information on the first image in the image to be processed; and replace corresponding pixels with the pixels of the image of the foreground layer to obtain the target image.

Optionally, the lighting processing unit 30 includes: an acquisition module configured to acquire simulation lighting parameters, which include at least one of the following: the illumination angle of the simulation light source, the distance between the simulation light source and the target 3D model, the amount of the simulation light source, the color temperature of the simulation light source, or the light intensity of the simulation light source; and an simulation lighting module configured to obtain the portrait lighting image by performing simulation lighting processing on the target 3D model based on the simulation lighting parameters.

Optionally, the lighting processing unit 30 may further include: a portrait lighting processing module configured to obtain a light-and-shadow image of the portrait by performing portrait lighting processing on the target 3D model; and a rendering module configured to render the image to be processed by using the light-and-shadow image of the portrait to obtain the portrait lighting image.

Optionally, the rendering module is configured to: obtain the portrait lighting image by multiplying the color values of pixels in the image to be processed by the color values of pixels in the light-and-shadow image of the portrait.

Optionally, the portrait lighting module is configured to: determine the illumination range of the simulation light source in the target 3D model based on the simulation lighting parameter, and determine the illumination value of pixels within the illumination range in the target 3D model based on the simulation lighting parameter; and obtain the light-and-shadow image of the portrait by summing the illumination value and the pixel value corresponding to the illumination value in the target 3D model.

Optionally, the apparatus is also configured to: obtain a detection result by detecting the light intensity of the target portrait in the image to be processed after acquiring the simulation lighting parameters; reduce the light intensity of the simulation light source in initial simulation lighting parameters and obtain the simulation lighting parameters, in the event that the detection result is that the light intensity is above a first set threshold; and increase the light intensity of the simulation light source in the initial simulation lighting parameters and obtain the simulation lighting parameters, in the event that the detection result is that the light intensity is below a second set threshold.

Optionally, the 3D reconstruction unit 20 is configured to: extract key points of the target portrait from the image to be processed; and input the key points of the target portrait into the artificial neural network to obtain the target 3D model of the target portrait.

Optionally, the lighting processing unit further includes: a separation module configured to separate the target portrait and a background image in the portrait lighting image by body segmentation, and obtain the first image including the target portrait from the portrait lighting image.

Optionally, the apparatus is also configured to: acquire an original image of the image to be processed; and acquire a distortion factor of a photographing device, perform distortion correction on the target portrait in the original image based on the distortion factor to obtain the image to be processed.

Optionally, the apparatus is also configured to acquire a material image to be added after merging the second image including the photographic background cloth and the first image into the target image; and add the material image into the target image, so that the image layer where the material image is located is disposed above the image layer where the target portrait in the target image is located.

The implementation principles and the technical effects of the apparatus provided by the embodiments of the present disclosure are the same as those of the foregoing method embodiments. For brief description, those not mentioned in the device embodiment may refer to the corresponding content in the foregoing method embodiments.

In addition, in the description of the embodiments of the present disclosure, unless explicitly stated and defined otherwise, the terms "mounted", "connected with", and "connected to" are to be understood broadly, for instance, may be fixed connection, detachable connection or integral connection; may be mechanical connection or electrical connection; may be directly connected, may be indirectly connected through an intermediate medium, or may be internal communication between two elements. The specific meanings of the above terms in the present disclosure can be understood by those skilled in the art according to specific conditions.

In the description of the present disclosure, it should be noted that the orientation or positional relationship indicated by the terms "center", "on", "beneath", "left", "right", "vertical", "horizontal", "inside", "outside" or the like is based on the orientation or positional relationship shown in the accompanying drawings, is merely for the convenience of describing the present disclosure and the simplified description, and does not indicate or imply that the device or component referred to has a specific orientation and is constructed and operated in a specific orientation, and therefore shall not be construed as the limitation to the present disclosure. In addition, the terms "first", "second", and "third" are used for descriptive purposes only and shall not be construed as indicating or implying the relative importance.

It could be clearly understood by those skilled in the art that for the convenience and brevity of the description, the specific working processes of the system, the device and the unit described above may refer to corresponding processes in the foregoing method embodiments, and detailed description will not be repeated herein.

In the several embodiments provided by the present application, it should be understood that the disclosed system, device and method may be implemented in other manners. The device embodiments described above are merely illustrative. For example, the division of the unit is only a logical function division. In actual implementations, there may be other division manners. Moreover, for example, multiple units or components may be combined or may be integrated into another system, or some characteristics may be ignored or not executed. In addition, the mutual coupling or direct coupling or communication connection shown or discussed may be indirect coupling or communication connection through some communication interfaces, devices or units, and may be electrical, mechanical or in other forms.

The units described as separate components may or may not be physically separated, and the components displayed as units may or may not be physical units, that is, may be arranged in one place, or may be distributed on multiple network units. Some or all of the units may be selected according to actual requirements to achieve the objectives of the solutions of the embodiments.

In addition, the functional units in the embodiments of the present disclosure may be integrated into one processing unit, or each unit may exist physically separately, or two or more units may be integrated into one unit.

The functions, if implemented in the form of software functional units and sold or used as separate products, may be stored in a processor-executable nonvolatile computer readable storage medium. Based on such understanding, the technical proposal of the present disclosure in essence, or a portion that contributes to the prior art, or a portion of the technical proposal may be embodied in the form of a software product. The computer software product is stored in a storage medium, including a plurality of instructions that are used to cause a computer device (may be a personal computer, server, or network device) to execute all or part of the steps of the methods in the embodiments of the present disclosure. The foregoing storage medium includes: a USB flash disk (UFD), a mobile hard disk, an ROM, an RAM, a magnetic disk, an optical disk or other media capable of storing program codes.

It should be finally noted that: the foregoing embodiments are merely the exemplary embodiments of the present disclosure, are used to explain the technical solutions of the present disclosure, and are not used to limit the present disclosure. The scope of protection of the present disclosure is not limited thereto. Although detailed description has been given to the present disclosure with reference to the foregoing embodiments, it shall be understood by those skilled in the art that modification may be made by those skilled in the art to the technical solutions described in the foregoing embodiments within the technical scope disclosed by the present disclosure, or variations may be easily made, or equivalent replacements may be made to partial technical features; and these modifications, variations or replacements of the present disclosure are not intended to allow the essence of corresponding technical solutions to depart from the spirit and scope of the technical solutions of the embodiments of the present disclosure, and shall fall within the protection scope of the present disclosure. Therefore, the protection scope of the present disclosure should be defined by the protection scope of the claims.

What is claimed is:

1. An image processing method, comprising:
   acquiring an image to be processed, the image to be processed comprising a target portrait;
   obtaining a target three-dimensional (3D) model by performing a 3D reconstruction operation on the target portrait in the image to be processed;
   obtaining a portrait lighting image by performing portrait lighting processing on the target 3D model, and extracting a first image comprising the target portrait from the portrait lighting image;
   merging a second image comprising an image of a photographic background cloth and the first image to obtain a target image, the second image being used as a background image of the first image:
   acquiring a material image to be added; and
   adding the material image into the target image, so that an image layer where the material image is located is above an image layer where the target portrait in the target image is located.

2. The method according to claim 1, wherein merging the second image comprising the image of the photographic background cloth and the first image to obtain the target image comprises:
   taking the second image as an image of a background layer, and taking the first image as an image of a foreground layer;
   determining a pixel in the image of the background layer corresponding to a pixel of the image of the foreground layer, based on position information on the first image in the image to be processed; and
   replacing the pixel of the image of the background layer with the pixel of the image of the foreground layer corresponding to the pixel of the image of the background layer to obtain the target image.

3. The method according to claim 1, wherein obtaining the portrait lighting image by performing the portrait lighting processing on the target 3D model comprises:
   acquiring simulation lighting parameters, the simulation lighting parameter comprising at least one of : an illumination angle of a simulation light source, a distance between the simulation light source and the target 3D model, an amount of the simulation light source, a color temperature of the simulation light source, or a light intensity of the simulation light source; and
   obtaining the portrait lighting image by performing simulation lighting processing on the target 3D model based on the simulation lighting parameters.

4. The method according to claim 3, subsequent to acquiring the simulation lighting parameters, further comprising:
   obtaining a detection result by detecting a light intensity of the target portrait in the image to be processed;
   reducing the light intensity of the simulation light source in the simulation lighting parameter in the event that the detection result is that the light intensity of the target portrait is above a first set threshold; and
   increasing the light intensity of the simulation light source in the simulation lighting parameter in the event that the detection result is that the light intensity of the target portrait is below a second set threshold.

5. The method according to claim 1, wherein obtaining the portrait lighting image by performing the portrait lighting processing on the target 3D model comprises:
   obtaining a light-and-shadow image of the target portrait by performing the portrait lighting processing on the target 3D model; and
   obtaining the portrait lighting image by rendering the image to be processed by using the light-and-shadow image of the target portrait.

6. The method according to claim 5, wherein obtaining the portrait lighting image by rendering the image to be processed using the light-and-shadow image of the target portrait comprises:
   obtaining the portrait lighting image by multiplying a color value of a pixel in the image to be processed by a color value of a pixel in the light-and-shadow image of the target portrait.

7. The method according to claim 5, wherein obtaining the light-and-shadow image of the target portrait by performing the portrait lighting processing on the target 3D model comprises:
- determining an illumination range of a simulation light source in the target 3D model based on a simulation lighting parameter, and determining an illumination value of a pixel within the illumination range in the target 3D model based on the simulation lighting parameter; and
- obtaining the light-and-shadow image of the target portrait by summing the illumination value and a pixel value corresponding to the illumination value in the target 3D model.

8. The method according to claim 1, wherein obtaining the target 3D model by performing the 3D reconstruction operation on the target portrait in the image to be processed comprises:
- extracting a key point of the target portrait from the image to be processed; and
- inputting the key point of the target portrait into an artificial neural network to obtain the target 3D model of the target portrait.

9. The method according to claim 1, wherein extracting the first image comprising the target portrait from the portrait lighting image comprises:
- separating the target portrait from a background image in the portrait lighting image by body segmentation to obtain the first image comprising the target portrait from the portrait lighting image.

10. The method according to claim 1, further comprising:
- acquiring an original image of the image to be processed; and
- acquiring a distortion factor of a photographing device, and performing distortion correction on the target portrait in the original image by using the distortion factor to obtain the image to be processed.

11. An electronic device, comprising a processor, a memory storing a computer program being capable of being executed by the processor,
the computer program when executed by the processor, causing the processor to perform the method according to claim 1.

12. A non-transitory computer-readable recording medium, storing a computer program, the computer program when executed by a computer, causing the computer to perform the method according to claim 1.

13. An image processing apparatus, comprising:
- an acquisition unit configured to acquire an image to be processed, the image to be processed comprising a target portrait;
- a 3D reconstruction unit configured to obtain a target 3D model by performing a 3D reconstruction operation on the target portrait in the image to be processed;
- a lighting processing unit configured to obtain a portrait lighting image by performing portrait lighting processing on the target 3D model, and extract a first image comprising the target portrait from the portrait lighting image;
- an image merging unit configured to merge a second image comprising an image of a photographic background cloth and the first image to obtain a target image, the second image being used as a background image of the first image;
- a material image acquisition unit configured to acquire a material image to be added; and
- a material image adding unit configured to add the material image into the target image, so that an image layer where the material image is located is above an image layer where the target portrait in the target image is located.

* * * * *